J. KNULL & J. P. PENCE.
Corn Planter.
No. 119,467. Patented Oct. 3, 1871.
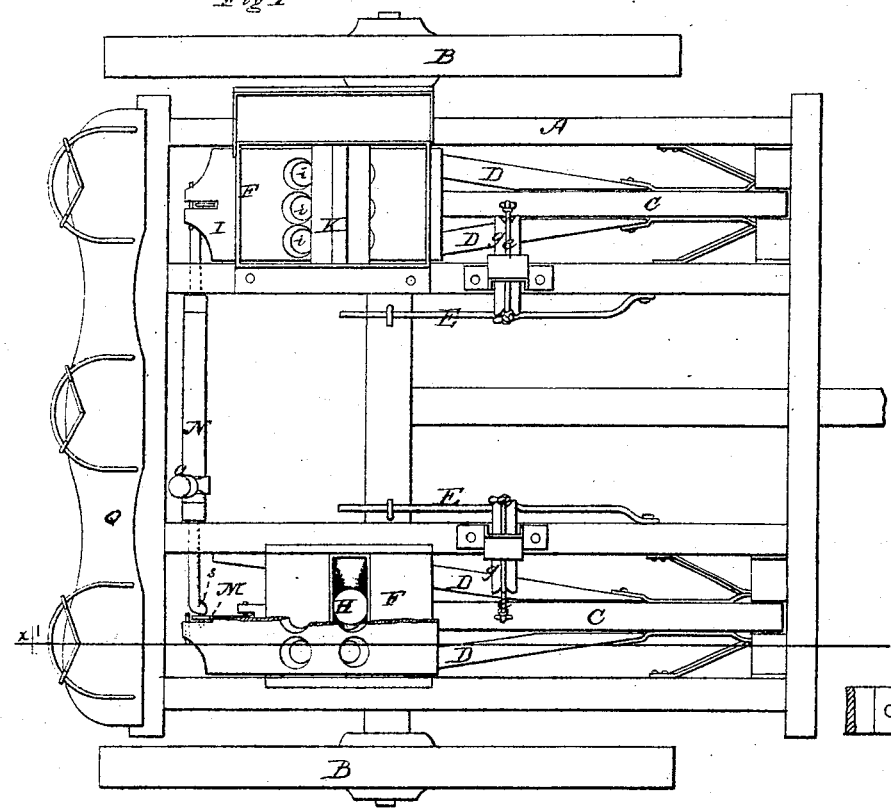
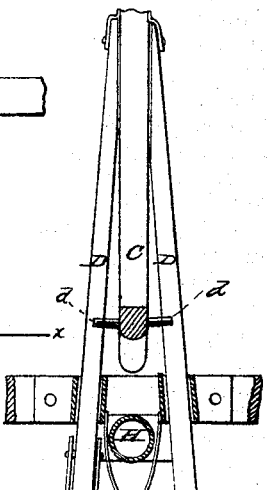
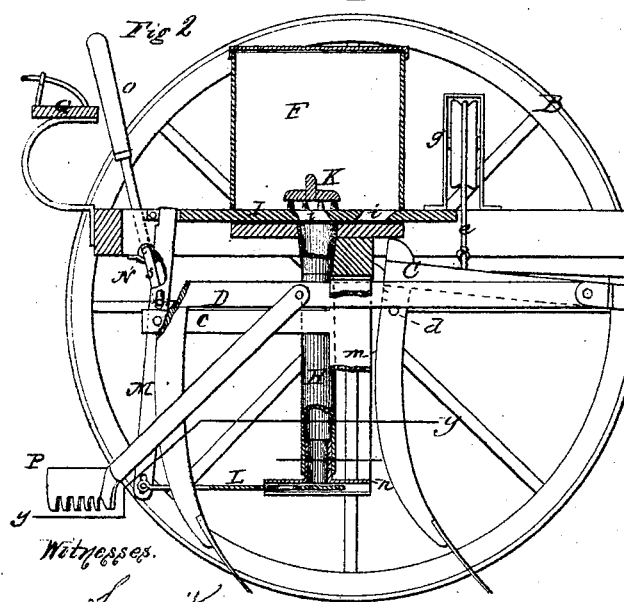
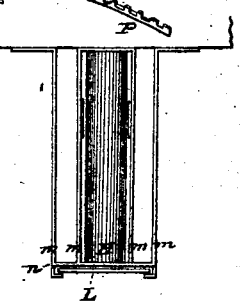
Witnesses.
Harry King
Phil. T. Dodge
Inventors.
J. Knull
J. P. Pence
by Dodge & Munn,
Attys.

UNITED STATES PATENT OFFICE.

JOHN KNULL AND JASON P. PENCE, OF SAINT PARIS, OHIO.

IMPROVEMENT IN CORN-PLANTERS.

Specification forming part of Letters Patent No. 119,467, dated October 3, 1871.

*To all whom it may concern:*

Be it known that we, JOHN KNULL and JASON P. PENCE, of Saint Paris, in the county of Champaign and State of Ohio, have invented certain Improvements in Corn-Planting Machines, of which the following is a specification, reference being had to the accompanying drawing.

Our invention relates to certain improvements in the corn-planting machine for which Letters Patent of the United States were granted to Fitzpatrick and Knull, December 21, 1869, numbered 98,157; and the improvements consist in a novel arrangement of devices for feeding and covering the corn.

Figure 1 is a top-plan view of our machine, with a portion of one hopper broken away. Fig. 2 is a longitudinal vertical section through the same on the line $x\ x$ of Fig. 1. Fig. 3 is a horizontal section on the line $y\ y$ of Fig. 2, looking upward; and Fig. 4 is a front view of the support of one of the lower slides.

A represents the frame of the machine, made of a rectangular form and mounted on two wheels, B. C C are two beams or drag-bars hinged one under each side of the frame, and each having two side beams, D, pivoted to it. The side beams D diverge toward the rear and extend back of the beams C, as shown in Fig. 3, and the beams C and D are each provided with a standard and shovel, as shown in Fig. 2. Thus it will be seen that the shovel on each beam C is followed by two shovels on beams D, one on each side. The beams C and D can each rise and fall independently of the other when in operation. E E are two foot-levers, pivoted one on each side of the frame, and each connected by a chain, $e$, passing over a pulley, $g$, on the frame, with the corresponding beam C below, so that by pressing down on the levers the beams C may be raised at their rear end so as to lift their shovels out of the ground. Each beam C is provided on its rear end with lateral pins $d$, which, when the beam is elevated, lift the side beams D. F F are corn-hoppers mounted on the rear end of the machine, one near each side, and each provided at the middle with a vertical depending tube, H, as shown in Figs. 1 and 2. In the bottom of each hopper is mounted a horizontal slide, I, provided with two holes or sets of holes, $i$; and above each slide, immediately over the tube H, is secured a cut-off bar, K, as shown in Figs. 1 and 2. When the slides are moved to and fro the cells or holes $i$ are filled and then carried under the cut-off so as to discharge into tubes H alternately, one set of holes discharging when the slide is moved forward, and the other set when it is moved backward. Under each hopper I mount four depending arms or bars, $m$, of equal length with the tube H, and to the lower end of the bars and the tube I secure a horizontal plate, $n$, the tube opening through the plate, as shown. L L are sliding plates, mounted one under each plate $n$, and each provided with a hole at its middle. M M are upright levers pivoted to rigid arms $c$ extending back of the tubes H, and connected at their upper ends to the slides I and at their lower ends to the slides L, so that when either lever is moved it operates the two slides of the adjoining tube, moving one forward while the other is moving backward, and vice versa. N is a transverse rock-shaft mounted on the rear of the frame, and provided on each end with a depending arm or crank, $s$, which works in a slot in the respective levers M, as shown in Figs. 1 and 2. The shaft N is provided with a hand-lever, O, by operating which the shaft and its cranks $s$ can be turned, and thereby the slides operated. When the lever is drawn backward the slides I are moved forward and slides L backward, and when the lever is moved forward the slides I are drawn backward and the other moved forward. The various parts are so arranged that at the instant when the slide I discharges corn into the tube the slide L is drawn to one side and the lower end of the tube closed, so that the corn rests on the plate. When the upper slide starts in the opposite direction the slide L is moved so as to bring its hole under the tube and prevent the escape of the corn therefrom. The bottom slide, however, continues its movement, so as to again close the tube, and the top slide then discharges into the tube again. In this manner it will be seen that each charge is held close to the ground until ready to be dropped, so that it will not be scattered by the forward movement of the machine while it is descending. On the rear end of the frame is mounted a transverse board or bar, Q, provided with three seats for the driver, one in the middle and one on each side, so that he may sit in whichever place circumstances may require. As the machine proceeds the shovels of beams C open furrows, and as the operator vibrates the handle corn is deposited in the furrows from tubes H, and then the shovels of beams D turn earth in upon the corn and cover the same. Behind the shovels, on beams D, I suspend a rake, P, standing obliquely to the line of travel, as shown in Fig. 3, so as to throw all large lumps or clods of earth off to one side, so as not to interfere with or obstruct the corn when it first rises through the ground.

Having described our invention, what we claim is—

A corn-planter, having the hinged beams C D provided with standard and shovels for opening a furrow for the seed and for covering the same, as described, in combination with the hopper F provided with the tube H, and the alternating slides I and L operated by the lever o, as set forth.

JOHN KNULL.
JASON P. PENCE.

Witnesses:
JOSEPH BUROKER,
M. M. MEHER.